Jan. 31, 1939.                C. PFANSTIEHL                2,145,275
                             TIP WELDING APPARATUS
                             Filed Feb. 27, 1937
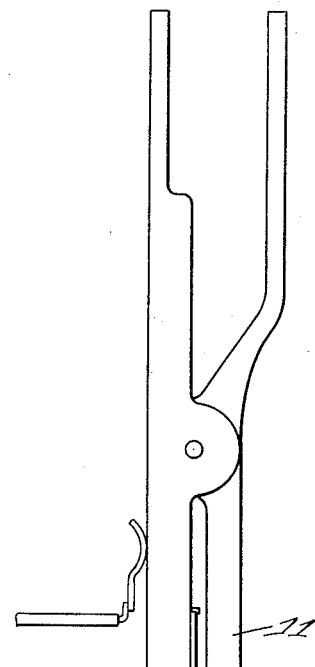
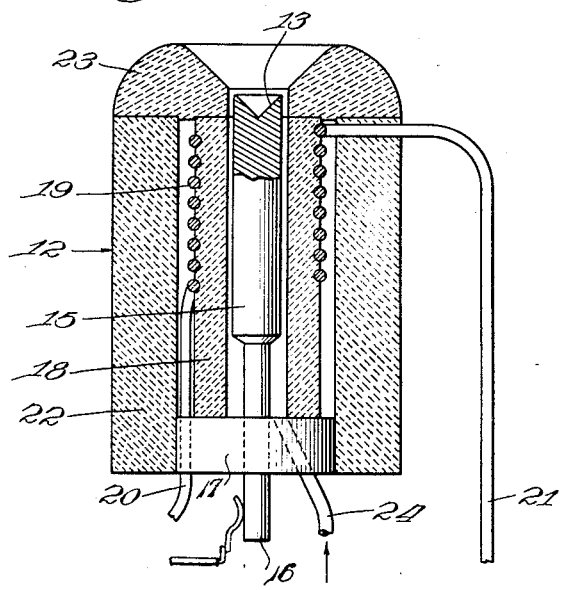
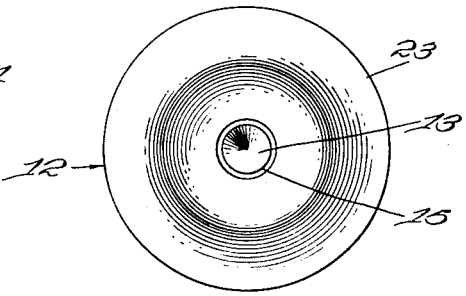
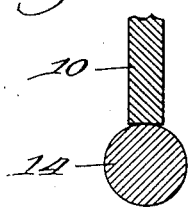
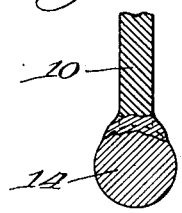
Inventor:
Carl Pfanstiehl.
By Dyrenforth, Lee, Chritton & Wiles
Attys.

Patented Jan. 31, 1939

2,145,275

UNITED STATES PATENT OFFICE 2,145,275

TIP WELDING APPARATUS

Carl Pfanstiehl, Highland Park, Ill., assignor to Pfanstiehl Chemical Company, a corporation of Illinois Application February 27, 1937, Serial No. 128,240

7 Claims. (Cl. 219—4)

This invention relates to tip welding apparatus, and more particularly to apparatus for welding metal tips to bases of metal differing therefrom in coefficient of thermal expansion.

One feature of this invention is that it provides an improved joint between small tip pellets and the bases to which they are welded.

Another feature of this invention is that it provides a joint between tips and bases of metal differing in melting point and coefficient of thermal expansion of such a type that subsequent changes in temperature will not cause the tip to crack off or separate from the base.

Other features and advantages of this invention will be apparent from the following specification and the drawing, in which:

Figure 1 is a side elevation of an embodiment of this invention; Fig. 2 is a detailed sectional view of the pellet holder; Fig. 3 is a top plan view of that holder; Fig. 4 is a detailed view of a pellet in contact with a base; and Fig. 5 is a detailed sectional view of the pellet and base after they have been welded.

It is frequently desirable to weld or join small tip elements to bases of a different metal. This is especially true where it is desirable, as in pen points or meter shaft bearings, to have a tip of very hard smooth metal. In the manufacture of pen points, for example, it has been customary to use tips of iridium, osmium, ruthenium or alloys of these and similar metals. The base metal of which the pen is made, generally gold or steel, has a lower melting point than these tip alloys, and when the tip is welded to the base in accordance with conventional practice the end of the base fuses and flows over part of the tip pellet, wetting the surface and adhering thereto when it freezes. Since the pellet metal does not melt, the strength of the joint depends upon this wetting action, and where the metals differ in coefficient of thermal expansion subsequent temperature changes to which the fabricated pen is exposed frequently caused the tip to crack loose from the base. This is, of course, an undesirable condition.

The present invention obviates these and other difficulties by providing a method and apparatus for welding small metal tips to bases of metal differing therefrom in coefficient of thermal expansion whereby a portion of the metal of each of the elements adjacent each other is caused to melt, so that the metal mingles before freezing. Thus a joint is provided of what may be termed a graduating alloy of the base and pellet metal. That is, the metal at the joint is practically the equivalent of the pellet metal adjacent the portion of the pellet which did not melt, and graduates through a mixture of the pellet and base metal to a metal which is practically that of the base adjacent that portion of the base which did not melt. Thus there is no one point or plane at which the metal differs greatly in coefficient of thermal expansion, with a tendency to cleave or crack.

In the particular embodiment of this invention illustrated herewith the metal base element 10, here illustrated as a pen, is gripped in a holder 11. A second holder 12 has a pocket 13 adapted to receive and hold a small metal pellet tip element 14 which it is desired to weld to the pen 10. One of the holders is movably mounted and, by any appropriate means, urged toward the other to bring the two elements together in lightly pressed contact. An operative welding circuit is provided for passing a welding current through the holders and elements, and for initiating and terminating the flow of current at desired intervals. Such apparatus in general is fully shown in my Patents Nos. 2,005,752, issued June 25, 1935, and 2,032,887, issued March 3, 1936, and a description of the remainder of the apparatus will not be repeated at this time.

The holder 12 comprises a central member or rod 15 of tungsten or other conductive material of very high melting point. The rod, as here shown, has a diameter of about one-eighth of an inch throughout its major portion, and a reduced lower portion 16 adapted to furnish one terminal for the welding current, the circuit being completed through the tip and base elements and the holder 11. The reduced portion 16 of the tungsten rod is mounted in a base 17 of molded ceramic material.

The rod is surrounded with a tube 18 of ceramic heat resisting material, preferably somewhat porous. This tube is here disclosed as being of alundum, a bonded aluminum oxide material. The tube 18 is provided on the outside thereof, about the upper portion of the rod 15, with grooves in which a heater element 19 is wound. This heater element comprises a plurality of turns of resistance wire with a high melting point, suitable for heating by electrical means, and may be of tungsten or molybdenum where it is surrounded by an atmosphere of hydrogen, for example. The heater element 19 terminates in leads 20 and 21 brought outside of the holder 12 and adapted to be supplied with current from a relatively low voltage, high amperage source. The element may be heated, for example, by a current of six to ten amperes at six volts.

An outer or second tube 22 of refractory material surrounds the base 17 and heater element 19, and serves as a heat insulating means to keep the heat developed by the element 19 within the holder. The top of the tubes may be sealed together, as here shown, by a refractory cement 23. This is preferably built up about the pocket 13 in the tungsten rod, so that hydrogen, supplied through the tube 24, will pass up about the tungsten rod and provide a reducing atmosphere about the pellet and base at the point of weld. The fact that the tube 18 is of porous material enables the wire comprising the heating element 19 to be also surrounded with hydrogen, so that a metal can be used which would otherwise break down were it exposed to oxygen.

In operation the heater element 19 would be continuously energized to maintain the tungsten rod 15 at a visible temperature, somewhere in the range from red heat up through white heat. This temperature would be so chosen as to be near but sufficiently below the point at which the metal element with the lowest melting point would fuse that there is no danger of melting of either of the elements before initiation of the welding current. The minute pellet, as for example a pellet having a high osmium content of fifty percent or more, would be fed to the pocket 13 by any appropriate means, the base 10 be placed in the holder 11, and the two brought together to urge the elements into lightly pressed contact with each other. The substantial temperature of the tungsten rod 15 would, because of its large heat storage capacity, of course, almost instantaneously heat the pellet 14 and the portion of the base 10 in contact to an equivalent temperature. The two elements, at least adjacent the junction thereof, would thus be heated to a temperature near but somewhat below the melting point of that one which would fuse at the lowest temperature. A welding current, supplied and initiated in accordance with known methods, would then be passed through the elements. The resistance at the junction or point of contact would cause a considerable amount of heat to be developed at this point, so that the junction of these two elements and the portions thereof immediately adjacent the junction would be raised to a much higher temperature, above that at which the element with the highest melting point would fuse.

Even though a pellet having a high osmium content, for example, were used in this device, the preheating to a substantial temperature would enable the welding current to effect a fusion or melting not only of part of the lower melting point base metal but also of a portion of the pellet metal adjacent the junction. Where the pellet is not previously heated to such a substantial temperature the passage of the welding current through the elements merely causes the base metal to melt and flow onto the pellet without melting any portion of the pellet metal. The duration of flow of the welding current must, of course, be brief, since were the current to remain on long enough to melt a pellet which had not been preheated, the base metal would be so greatly fused that it would flow down all around the pellet and require subsequent grinding or other operations to remove it. Where the holder rod is raised to a substantial temperature before the passage of the welding current not only is the pellet raised to a similar temperature, but loss of the heat subsequently generated at the junction by the welding current through transfer to the holder rod is reduced, since the temperature differential between the junction at the time of welding and the holder rod is nowhere near as great as when the rod is at room temperature or only slightly higher.

Reference to Fig. 5 shows the type of weld or joint achieved by this method and apparatus. Not only is base metal melted, but also a portion of the pellet metal adjacent the junction, so that the two metals mingle before freezing when the welding current is stopped. The mingling of the metals provides a joint which graduates from the metal of the pellet to that of the base, so that expansions of the pellet and base when exposed to temperature changes do not result in stresses localized at one point.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

I claim:

1. A tip element holder for apparatus for welding small metal pellet tips to bases of metal differing therefrom in melting point and coefficient of thermal expansion, including: a metal member of very high melting point, said member having a pocket adapted to receive said tip element; a resistance element about said member adapted to be heated by an electric current; an outer envelope of refractory material, and means for passing a current through the metal member of high melting point and a tip element held in the pocket thereof.

2. A tip element holder for apparatus for welding small metal pellet tips to bases of metal differing therefrom in melting point and coefficient of thermal expansion, including: a metal member of very high melting point, said member having a pocket adapted to receive said tip element; a tube of porous refractory material about said member; a resistance element about said tube adapted to be heated by an electric current; a second tube of refractory material about said resistance element, said tube rising about said pocket; and means for admitting a reducing gas about said rod and within said first tube.

3. In a welding apparatus for welding small objects, in which a tip element and a base element are held in lightly pressed contact, means for heating said elements to a substantial temperature, and means for briefly heating the junction of the elements to a much higher temperature.

4. In a welding aparatus for welding small objects, in which a tip element and a base element are held in lightly pressed contact, means for heating said elements to a temperature near that at which the element with the lowest melting point fuses, and means for briefly heating the elements, at least adjacent the junction thereof, to a temperature above that at which the metal with the highest melting point fuses.

5. In a welding apparatus for welding small objects, in which a small metallic tip element and a metallic base element of widely different melting point than the tip are held in lightly pressed contact; a holder of very high melting point metal for said tip element, means for heating said tip holder to a temperature near that at which the metal with the lowest melting point fuses, and means for briefly passing a welding current through the elements to heat them, at least adjacent the junction thereof, to a temperature above that at which the metal with the highest melting point fuses.

6. In a welding apparatus for welding small tips to bases, a rod of very high melting point metal, means for heating the rod to a high temperature below its melting point, a recess in the rod to receive a tip pellet, and means for passing a welding current through the rod and pellet, the rod being relatively very large compared to the tip pellet, whereby its heat may be transmitted to a tip pellet dropped in said recess without materially diminishing the temperature of the rod.

7. In a welding apparatus for welding small tips to bases, a rod consisting essentially of very high melting point metal, means for heating the rod to a high temperature below its melting point, means for positioning a tip pellet on the rod, and means for passing a welding current through the rod and pellet, the rod being relatively very large compared to the pellet, whereby its heat may be transmitted to a tip pellet in said positioning means without materially diminishing the temperature of the rod.

CARL PFANSTIEHL.